T. COPE.
TROLLEY CONTACT SIGNAL OR SWITCH SYSTEM.
APPLICATION FILED OCT. 18, 1910.
1,050,000.
Patented Jan. 7, 1913.
2 SHEETS—SHEET 1.
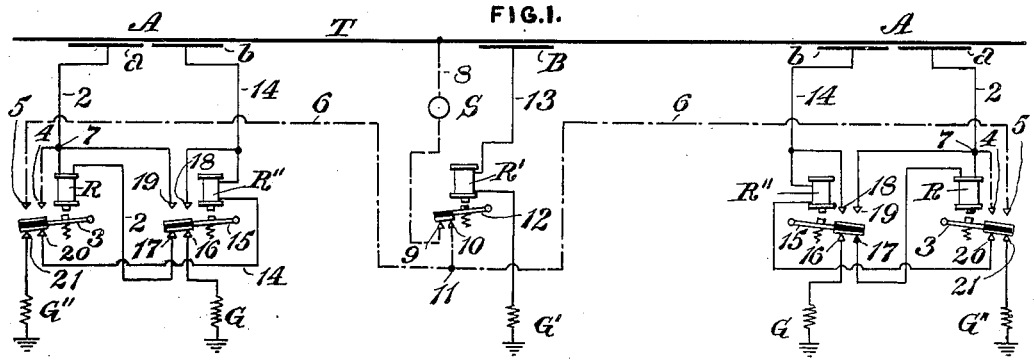
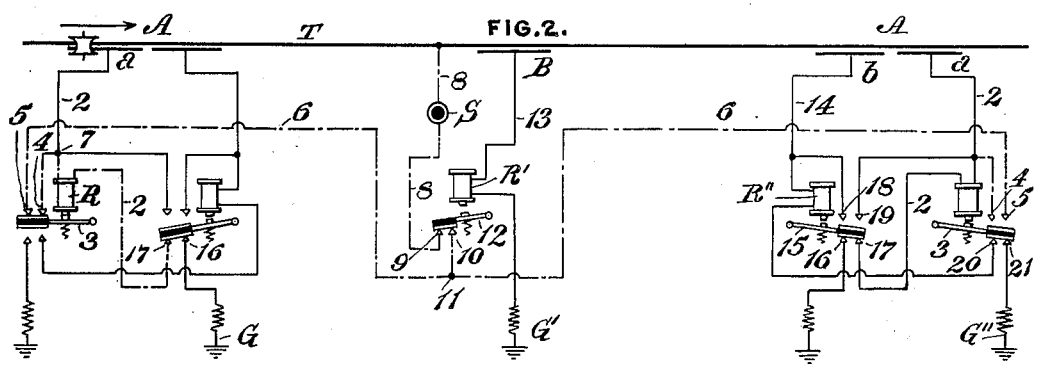
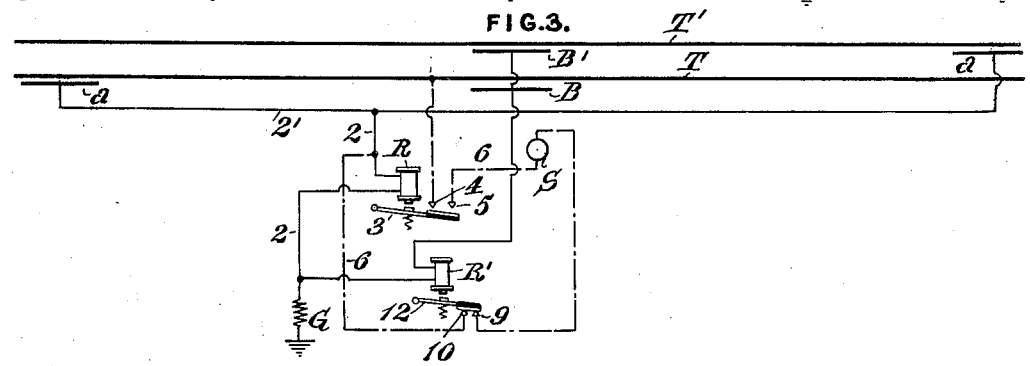
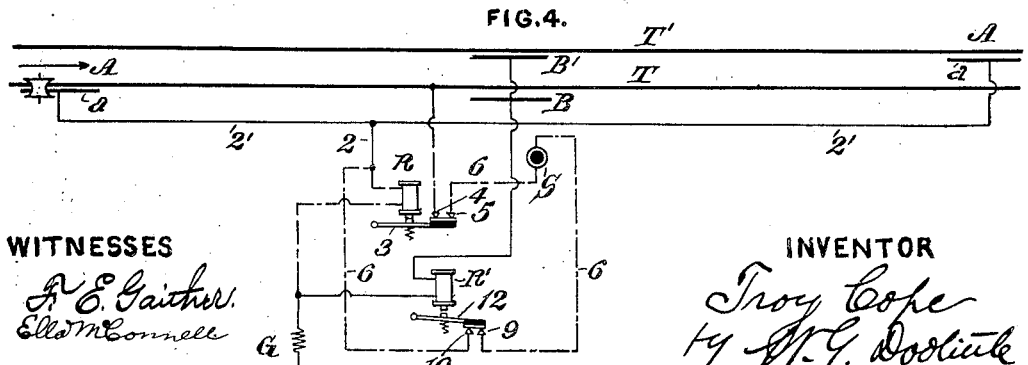
WITNESSES
INVENTOR
Troy Cope

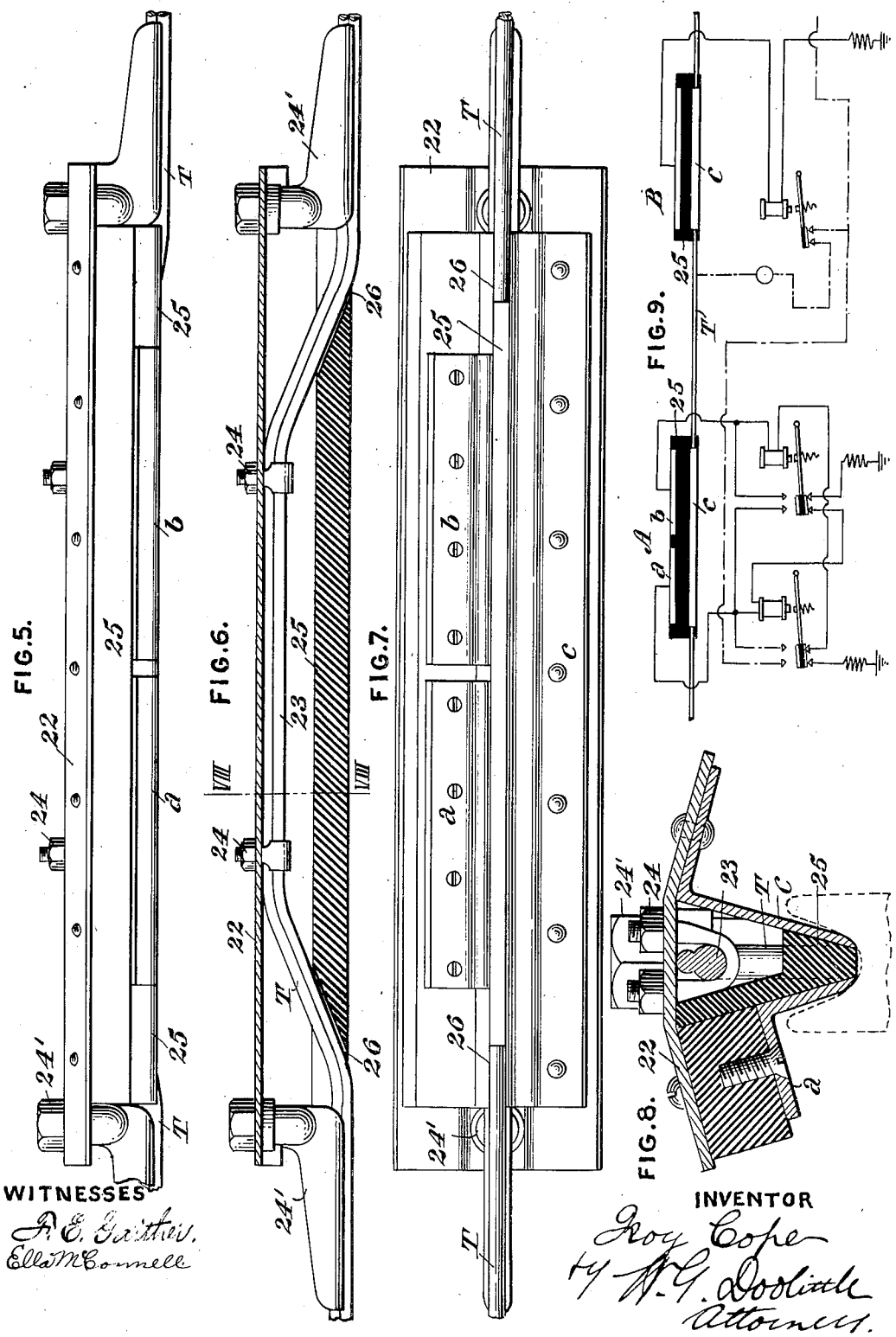

UNITED STATES PATENT OFFICE.

TROY COPE, OF NEW WATERFORD, OHIO.

TROLLEY-CONTACT SIGNAL OR SWITCH SYSTEM.

1,050,000.  Specification of Letters Patent.  Patented Jan. 7, 1913.

Application filed October 18, 1910. Serial No. 587,737.

*To all whom it may concern:*

Be it known that I, TROY COPE, a resident of New Waterford, in the county of Columbiana and State of Ohio, have invented certain new and useful Improvements in Trolley-Contact Signal or Switch Systems, of which the following is a specification.

My invention relates to a new and improved trolley contact signal or switch system.

In the accompanying drawings, I have illustrated my invention as applied to a trolley contact signal system, and have shown applications of my invention embodied in a signal system having means for operating signals on a single track electric railway, wherein it is desired to actuate the signal when a car is passing a crossing in either direction. Also an embodiment of my invention when applied to a double track railway system in which it is desired to operate a signal upon the approach of a car in either direction. It is obvious, however, that my system may be employed for operating switches instead of signals, not only in connection with overhead trolley wires, but where underground or third rail conductors are employed. My system is also applicable for operating a signal or switch upon a passage of a car in one direction, and be inoperative when passing in the opposite direction.

In the accompanying drawings, which illustrate applications of my invention Figure 1 is a diagrammatic view of my invention when applied to a single trolley wire of a single track railway, showing the relay and signal circuits open; Fig. 2, a similar view showing the trolley wheel in contact with a trolley contact device and the signal circuit closed; Fig. 3, a diagrammatic view of my invention as applied to a double track railway having two trolley wires, showing the position of the parts of the circuits before a trolley wheel makes contact with a trolley contact; Fig. 4, a view similar to Fig. 3, showing the trolley wheel in contact with a trolley contact and the position of the parts; Fig. 5, a side elevational view of my trolley contact; Fig. 6, a part vertical section and a part elevation of the same; Fig. 7, a top plan; Fig. 8, an enlarged vertical sectional view shown in connection with a portion of a trolley wheel, the section being taken on line VIII—VIII of Fig. 6; and Fig. 9, a diagrammatic view of my system embodying the trolley contacts illustrated.

Referring to Figs. 1 and 2 of the accompanying drawings illustrating the application of my device to a railway system employing a single track and trolley wire, T is the trolley wire and S the signal located adjacent a crossing and adapted to be operated by a car approaching from either direction. A are the trolley contact members located on opposite sides of the crossing and brought into circuit with the trolley wire by a passing trolley wheel to set the signal at danger when a car is approaching the crossing and prevent its being set by a car moving away from the crossing, and B is the trolley contact member for breaking the signal circuit to allow the signal to return to safety when the car is passing over the crossing. Contact members A each comprise two contact strips *a* and *b*, the former of which are provided with circuit connections 2, terminating in resistance coils and ground connections G, and connected to signal setting relay magnets R controlling the operation of arms 3, adapted, when magnets R are energized, to engage contact points 4 and 5 to close signal operating circuit 6. Contact points 4 are connected at 7 to circuits 2, while contact points 5 form the terminals of signal circuit 6. Signal S is directly connected to trolley wire T by circuit 8 the opposite end of which terminates in contact point 9 adapted to be normally in engagement with contact point 10 directly connected to circuit 6 at 11. Movable arms 12 are normally in engagement with contact points 9 and 10, and are moved to break contact by means of breaker relay R′ operated by circuit 13 leading therefrom to trolley contact B and resistance coil and ground connection G′. To prevent the signal being operated by the trolley of a car coming into contact with strips *a* after leaving the crossing, strips *b* are provided with circuit connections 14 terminating in resistance coils and ground connections G″, and connected to relay magnets R″ controlling the operation of arms 15, adapted, when magnets R″ are deënergized, to make contact between points 16 and 17 in circuits 2, and when the magnets are energized to engage points 18 and 19 connected respectively to circuits 14 and 2. Circuits 14 are further provided with contact points 20 and 21 normally in engagement with arms 3 when the latter are out of engagement with contact points 4 and 5. By reference to the foregoing it will be seen that in their normal condition all of the relay magnets R, R' and R'' will be deenergized with signal operating circuit 6 broken by reason of arm 3 being out of engagement with contacts 4 and 5, and signal S will remain at safety. When the trolley wheel of a car passing from left to right makes contact between wire T and strip $a$, as shown in Fig. 2, relay magnet R will first be energized bringing arm 3 into engagement with points 4 and 5 closing circuits 6, and allowing current to flow from trolley wire T through circuit 8 to signal S, breaker relay contacts 9 and 10, connection 11 to circuit 6 thence through setting relay contacts 4 and 5, relay R, contacts 17 and 16 to ground connection G thus setting signal S at danger, in which position it will remain until the trolley wheel makes engagement between strip B and wire T when current will flow through circuit 13 to breaker relay R' energizing the latter and moving arm 12 out of contact with points 9 and 10 breaking signal circuit 6, deënergizing setting relay R, opening contacts 4 and 5, and allowing signal S to return to safety. After the car leaves the crossing as soon as the trolley wheel makes contact between wire T and strip $b$ current will flow through circuit 14 energizing relay magnet R'', and thereby moving arm 15 into engagement with contact points 18 and 19, and breaking contact between points 16 and 17 which are in the setting relay circuit 2, thereby preventing operation of the signal when trolley next comes into engagement with the adjacent strip $a$. Strips $a$ and $b$ are located in proximity to each so the trolley will form a bridge in passing from one to the other, and by reason of the connections between points 18 and 19 and wires 2 and 14 relay magnet R'' will continue to be energized until after the trolley wheel has passed from strip $a$ to strip $b$ and left the latter.

Figs. 3 and 4 illustrate the application of my device to a railway system employing either double tracks and trolley wires, or a single track provided with double trolley wires to be used by cars traveling in opposite directions. In this construction it will be obvious that by reason of contacts $a$ being used in connection with separate trolley wires, it will not be necessary to break setting relay circuit 2 after the car has passed the crossing, hence trolley contact strips $b$, relay R'' and the circuits operating them may be dispensed with, the device being similar in construction and operation to that shown in Figs. 1 and 2 in all other respects, except that an additional trolley contact breaker B' is provided for the extra trolley wire T', and circuit 2 is provided with branches 2' leading to the trolley contacts $a$.

Figs. 5 to 9 illustrate in detail the construction of my improved trolley contact comprising a sheet steel support or housing 22, mounted upon a bent-up portion 23 of the trolley wire T and secured thereto by clips 24 and standards 24', or any other suitable manner. 25 is a depending strip of insulating material, wedge shape in cross section, secured to the underside of the housing and extends below the bent-up portion of the trolley wire and is provided near its ends with slots 26 through which the trolley wire passes, as shown in Fig. 6. Light metal angle contact strips $a$ and $b$ arranged in line with each other are secured to one side of the depending portion of the insulating strip, and upon its opposite side is located a continuous angular metallic contact strip $c$ directly connected to housing 22 and adapted to form an unbroken metallic path for the trolley wheel below the bent-up portion of the trolley wire. Insulating strip 25 being of wedge-like form with contacts $a$, $b$ and $c$ arranged upon its opposite sides fits snugly in the groove of the trolley wheel, the contact strips resting on the bottom of the groove, as shown in Fig. 8, thereby forming a perfect contact while the car is passing, and preventing the wheel leaving the wire. It will be noted that the car running circuit is not broken while the wheel is passing under the contact, by reason of the continuous strip $c$, and strips $a$ and $b$ will form a perfect connection for the passage of a current from the trolley wire to the signal operating mechanism when the trolley wheel is in position to engage either of them and strip $c$. For use in connection with cars running in one direction only or when used in combination with a signal breaker circuit strips $a$ and $b$ are made continuous, as shown at B, Fig. 9.

What I claim is:—

1. In a signal system for electric railways, an electric current conductor, a circuit normally open at the conductor containing a relay and running from thence direct to ground through a normally closed break, a circuit connected at one end directly to said conductor and containing a distance signal, a normally closed and a normally open break and joined to the ground circuit between the relay and the current conductor, said relay closing the normally open signal circuit when the ground circuit therethrough is closed by a passing car and setting the signal, said signal circuit remaining closed through its connection to the relay after the ground circuit is broken, and a third circuit normally open to the current conductor running to ground and containing a relay which when vitalized by a passing car closing the circuit running therethrough breaks the signal circuit to cause a change in the signal.

2. In a signal system for electric railways, an electric current conductor, a circuit connected directly to said conductor and containing a signal, said circuit having a normally open and a normally closed break, two independent circuits to ground each being normally open at said conductor, a relay magnet in each of said ground circuits, one of said relays being also included in the signal circuit, and means attached to each ground circuit adjacent said conductor and insulated from each other, which when momentarily connected thereto by the current collector of a passing car close their respective ground circuits to independently vitalize said relays, a circuit closer actuated by that one of said relays which is in the signal circuit to close the open break in the signal circuit and direct it through said relay when the car is traveling in one direction to maintain said signal circuit, a circuit closer actuated by the other relay when the car passes in the opposite direction to open the ground circuit through the first relay and prevent the actuation of the signal, and a normally open circuit containing a relay at a distance for opening said signal circuit, when said relay circuit is closed by a passing car.

3. In combination, an electrical conductor, a continuous contact member located upon one side of the same and connected thereto, a pair of contact members located upon the opposite side of said conductor insulated therefrom and from each other, and arranged in line to be successively engaged by a movable member adapted to travel along the continuous member, a normally open signal circuit connected directly to said conductor, a ground circuit connected to one of the pair of contact members, an electro-magnet in said ground circuit and signal circuit, a circuit closer operated by said electro-magnet for closing the open signal circuit and directing the current therein through said electro-magnet to maintain the vitalization of the magnet and the signal circuit after the moving member has passed off the said pair of contact members, a second ground circuit connected to the other contact member of said pair and normally closed to ground by the aforesaid circuit closer, a normally open shunt connection between said ground circuits, a relay in said second ground circuit adapted to operate a circuit breaker to open the first mentioned ground circuit and close said shunt connection between the two ground circuits when the movable member travels away from the signal, and a normally open ground circuit at a distance containing a relay for opening said signal circuit when the relay circuit is closed by the movable member.

In testimony whereof I affix my signature in presence of two witnesses.

TROY COPE.

Witnesses:
ROSCOE T. SHINER,
R. E. MORGAN.